US012611755B2

(12) United States Patent
Kukucka et al.

(10) Patent No.: US 12,611,755 B2
(45) Date of Patent: Apr. 28, 2026

(54) METHODS AND APPARATUSES FOR DISLODGING FOREIGN OBJECTS FROM FASTENER EXTRACTORS

(71) Applicant: GRIP HOLDINGS LLC, Brandon, FL (US)

(72) Inventors: Paul Kukucka, Brandon, FL (US); Thomas Stefan Kukucka, Brandon, FL (US)

(73) Assignee: GRIP HOLDINGS LLC, Brandon, FL (US)

( * ) Notice: Subject to any disclaimer, the term of this patent is extended or adjusted under 35 U.S.C. 154(b) by 0 days.

(21) Appl. No.: 19/241,069

(22) Filed: Jun. 17, 2025

(65) Prior Publication Data

US 2025/0312902 A1 Oct. 9, 2025

Related U.S. Application Data

(63) Continuation-in-part of application No. 18/054,354, filed on Nov. 10, 2022, now Pat. No. 12,337,449, which is a continuation-in-part of application No. 16/997,621, filed on Aug. 19, 2020, now Pat. No. 11,511,409, which is a continuation-in-part of application No. 16/255,341, filed on Jan. 23, 2019, now Pat. No. 11,154,969, said application No. (Continued)

(51) Int. Cl.
*B23P 11/00* (2006.01)
*B25B 27/18* (2006.01)

(52) U.S. Cl.
CPC .................................. *B25B 27/18* (2013.01)

(58) Field of Classification Search
CPC ..... B25B 27/18; B25B 27/062; B25B 27/023; B23P 11/00
See application file for complete search history.

(56) References Cited

U.S. PATENT DOCUMENTS 1,549,041 A 8/1925 Berg
1,798,944 A 3/1931 Jackman
(Continued)

FOREIGN PATENT DOCUMENTS

AU 201612229 4/2016
AU 201612720 6/2016
(Continued)

*Primary Examiner* — Jun S Yoo

(57) ABSTRACT

A method for removing a foreign object from a socket. The method comprises providing a socket and a foreign object removal system adaptor, wherein the foreign object removal system adaptor includes a pusher, an adaptor, and at least one retaining assembly. The method further comprises engaging the socket attachment body to the socket and threadedly engaging the main shaft of the pusher with the main channel of the adaptor. The method further comprises engaging the retaining assembly by applying rotational torque to the drive head of the pusher in the tightening direction. The method further comprises applying additional rotational torque to the drive head until the foreign object is removed from the socket opening. The method further comprises disengaging the retaining assembly and removing the foreign object removal system adaptor from the socket by applying rotational torque to the drive head in the loosening direction.

21 Claims, 16 Drawing Sheets

Related U.S. Application Data

16/997,621 is a continuation-in-part of application No. 16/514,117, filed on Jul. 17, 2019, now abandoned, and a continuation-in-part of application No. 16/107,842, filed on Aug. 21, 2018, now Pat. No. 10,780,556, which is a continuation-in-part of application No. 15/650,768, filed on Jul. 14, 2017, now Pat. No. 10,081,094.

(60) Provisional application No. 62/733,507, filed on Sep. 19, 2018, provisional application No. 62/888,656, filed on Aug. 19, 2019.

(56) References Cited

U.S. PATENT DOCUMENTS 2,969,250 A 1/1961 Kull
3,273,430 A 9/1966 Knudsen
3,405,377 A 10/1968 Pierce
3,495,485 A 2/1970 Knudsen et al.
3,902,384 A * 9/1975 Ehrler .................... B25B 13/54 81/445
3,908,489 A 9/1975 Yamamoto et al.
3,913,427 A 10/1975 Brase
4,074,597 A 2/1978 Jansson
4,361,412 A 11/1982 Stolarczyk
4,536,115 A 8/1985 Helderman
4,598,616 A 7/1986 Colvin
4,607,547 A 8/1986 Martus
4,651,596 A 3/1987 Rachanski
4,724,608 A * 2/1988 Parrott .................. B25B 27/023 29/259
4,893,530 A 1/1990 Warheit
4,927,020 A 5/1990 Randy
4,930,378 A 6/1990 Colvin
5,019,080 A 5/1991 Hemer
5,031,487 A 7/1991 Polonsky
5,219,392 A 6/1993 Ruzicka et al.
5,228,570 A 7/1993 Robinson
5,251,521 A 10/1993 Burda et al.
5,398,823 A 3/1995 Anders
5,481,948 A 1/1996 Zerkovitz
5,501,342 A 3/1996 Geibel
5,519,929 A 5/1996 Bleckman
5,577,871 A 11/1996 Brugola
5,645,177 A 7/1997 Lin
5,649,791 A 7/1997 Connolly
5,669,516 A 9/1997 Horn
5,718,028 A * 2/1998 Hasenberg ............ B25B 27/023 29/264
5,725,107 A 3/1998 Dembicks
5,737,981 A 4/1998 Hildebrand
5,743,394 A 4/1998 Martin
5,782,148 A 7/1998 Kerkhoven
5,829,327 A 11/1998 Stanton
5,832,792 A 11/1998 Hsieh
5,868,049 A 2/1999 Kanwal
5,873,290 A 2/1999 Chaconas
5,904,076 A 5/1999 Siwy
6,009,778 A 1/2000 Hsieh
6,079,299 A 6/2000 Sundstrom
6,092,279 A 7/2000 Shoup
6,352,011 B1 3/2002 Fruhm
6,431,373 B1 8/2002 Blick
6,575,057 B1 6/2003 Ploeger
6,584,662 B1 * 7/2003 Krick .................. B25B 27/0035 81/53.2
6,626,067 B1 9/2003 Iwinski
6,698,316 B1 3/2004 Wright
6,729,208 B1 5/2004 Chrzanowski
6,755,098 B2 6/2004 Huang
6,761,089 B2 7/2004 Bergamo
6,857,340 B2 2/2005 Wagner
6,951,156 B2 10/2005 Garg
7,000,501 B1 2/2006 Chen
D524,615 S 7/2006 Albertson
7,137,514 B1 11/2006 Nickipuck
7,225,710 B2 6/2007 Pacheco, Jr.
7,331,260 B2 2/2008 Cheng
7,434,494 B1 10/2008 Snider
D614,931 S 5/2010 Su
7,717,278 B2 5/2010 Kao
7,788,994 B2 9/2010 Wright et al.
7,814,814 B2 10/2010 Whitehead
7,841,480 B2 11/2010 Hsieh
7,913,593 B2 3/2011 Dahar et al.
8,166,851 B2 5/2012 Pchola
8,302,255 B2 11/2012 Lin
8,336,709 B1 12/2012 Geibel
8,640,575 B2 2/2014 Huang
9,132,533 B2 9/2015 Lesche et al.
D745,814 S 12/2015 Hsieh
D776,505 S 1/2017 Doroslovac
D784,106 S 4/2017 Doroslovac
9,687,968 B2 6/2017 Doroslovac et al.
D794,405 S 8/2017 Doroslovac et al.
9,718,170 B2 8/2017 Eggert et al.
D798,682 S 10/2017 Doroslovac et al.
9,873,195 B1 1/2018 Buxton
9,878,441 B1 1/2018 Kao
D829,069 S 9/2018 Doroslovac et al.
10,081,094 B2 9/2018 Doroslovac et al.
10,328,554 B2 6/2019 Todd
D859,944 S 9/2019 Kukucka et al.
D859,945 S 9/2019 Kukucka et al.
D859,946 S 9/2019 Kukucka et al.
D859,947 S 9/2019 Kukucka et al.
D867,841 S 11/2019 Kukucka et al.
D868,553 S 12/2019 Kukucka et al.
10,493,519 B2 12/2019 Ross
D879,577 S 3/2020 Kukucka et al.
D880,968 S 4/2020 Kukucka et al.
D880,977 S 4/2020 Kukucka et al.
D885,149 S 5/2020 Kukucka et al.
D887,233 S 6/2020 Kukucka et al.
D887,711 S 6/2020 Kukucka et al.
D889,224 S 7/2020 Kukucka et al.
D889,257 S 7/2020 Kukucka et al.
D892,578 S 8/2020 Kukucka et al.
10,780,556 B2 9/2020 Kukucka et al.
10,786,890 B2 9/2020 Kukucka et al.
D899,091 S 10/2020 Kukucka et al.
10,828,766 B2 11/2020 Kukucka et al.
D904,152 S 12/2020 Kukucka et al.
D906,781 S 1/2021 Kukucka et al.
10,882,162 B2 1/2021 Kukucka et al.
D909,842 S 2/2021 Kukucka et al.
D910,490 S 2/2021 Lim et al.
10,919,133 B2 2/2021 Kukucka et al.
10,967,488 B2 4/2021 Kukucka et al.
11,045,925 B2 6/2021 Kukucka et al.
11,154,969 B2 10/2021 Kukucka et al.
11,364,602 B2 6/2022 Kukucka et al.
2003/0209111 A1 11/2003 Huang
2004/0093996 A1 5/2004 Fu
2004/0256263 A1 12/2004 Shih
2005/0098459 A1 5/2005 Gorman
2005/0103664 A1 5/2005 Shih
2005/0183548 A1 8/2005 Horobec
2005/0194330 A1 9/2005 Ziske
2005/0257357 A1 11/2005 Huang
2005/0274233 A1 12/2005 Lin
2006/0130618 A1 6/2006 Hsieh
2006/0156869 A1 7/2006 Hsieh
2006/0266168 A1 11/2006 Pacheco, Jr.
2007/0005070 A1 1/2007 Kay et al.
2007/0261519 A1 11/2007 Cheng
2008/0072717 A1 3/2008 Stumpf
2008/0235930 A1 10/2008 English
2009/0007732 A1 1/2009 Hsieh
2009/0120885 A1 5/2009 Kao
2009/0220321 A1 9/2009 Sakamura
2009/0255384 A1 10/2009 Whitehead
2010/0065520 A1 3/2010 Hsieh

(56) References Cited

U.S. PATENT DOCUMENTS

| | | | |
|---|---|---|---|
| 2011/0056339 A1 | 3/2011 | Su | |
| 2011/0303052 A1 | 12/2011 | Chen | |
| 2012/0060656 A1 | 3/2012 | Chang | |
| 2012/0096992 A1 | 4/2012 | Huang | |
| 2012/0132039 A1 | 5/2012 | Su | |
| 2012/0137842 A1 | 6/2012 | Guo | |
| 2013/0047798 A1 | 2/2013 | Huang | |
| 2013/0195581 A1 | 8/2013 | Unseld et al. | |
| 2013/0213193 A1 | 8/2013 | Lukes | |
| 2013/0263706 A1 | 10/2013 | Safar | |
| 2014/0260832 A1 | 9/2014 | Hsiao | |
| 2014/0311302 A1 | 10/2014 | Taguchi et al. | |
| 2014/0331826 A1 | 11/2014 | Campbell | |
| 2014/0360321 A1 | 12/2014 | Steinweg et al. | |
| 2015/0135910 A1 | 5/2015 | Eggert et al. | |
| 2015/0266169 A1 | 9/2015 | Campbell, II | |
| 2015/0314429 A1 | 11/2015 | Doroslovac | |
| 2015/0321332 A1 | 11/2015 | Lee | |
| 2016/0067853 A1 | 3/2016 | Neto | |
| 2016/0136792 A1 | 5/2016 | Harp | |
| 2016/0223005 A1 | 8/2016 | Rathmann | |
| 2016/0271764 A1 | 9/2016 | Huang | |
| 2016/0339564 A1 | 11/2016 | Chen | |
| 2017/0028538 A1 | 2/2017 | Lourenco et al. | |
| 2017/0246733 A1 | 8/2017 | Shehab | |
| 2017/0252905 A1 | 9/2017 | Doroslovac | |
| 2017/0282337 A1 | 10/2017 | Johnson et al. | |
| 2017/0312839 A1 | 11/2017 | Moss et al. | |
| 2017/0312897 A1 | 11/2017 | Doroslovac et al. | |
| 2018/0003241 A1 | 1/2018 | Goss | |
| 2018/0141192 A1 | 5/2018 | Chang | |
| 2018/0354022 A1 | 12/2018 | Ross et al. | |
| 2018/0354102 A1 | 12/2018 | Kukucka et al. | |
| 2019/0001469 A1 | 1/2019 | Cho et al. | |
| 2019/0015961 A1 | 1/2019 | Kukucka et al. | |
| 2019/0152033 A1* | 5/2019 | Kukucka | B25B 15/008 |
| 2019/0217449 A1 | 7/2019 | Lee | |
| 2019/0283233 A1 | 9/2019 | Kukucka et al. | |
| 2019/0337131 A1 | 11/2019 | Kukucka et al. | |
| 2019/0375077 A1 | 12/2019 | Kukucka et al. | |
| 2020/0070321 A1 | 3/2020 | Schulz | |
| 2020/0078908 A1 | 3/2020 | Wu et al. | |
| 2020/0269398 A1 | 8/2020 | Donovan | |
| 2020/0298380 A1 | 9/2020 | Doroslovac et al. | |
| 2020/0353606 A1 | 11/2020 | Kukucka et al. | |
| 2020/0361066 A1 | 11/2020 | Kukucka et al. | |
| 2020/0376648 A1 | 12/2020 | Kukucka et al. | |
| 2020/0391360 A1 | 12/2020 | Kukucka et al. | |
| 2021/0039245 A1 | 2/2021 | Kukucka et al. | |
| 2021/0148395 A1 | 5/2021 | Kukucka et al. | |
| 2022/0040830 A1 | 2/2022 | Kukucka et al. | |
| 2022/0281085 A1 | 9/2022 | Kukucka et al. | |

FOREIGN PATENT DOCUMENTS

| | | | |
|---|---|---|---|
| AU | 201612721 | | 6/2016 |
| CA | 2564093 | A1 | 4/2007 |
| CA | 168071 | | 12/2016 |
| CA | 2898480 | A1 | 7/2017 |
| CA | 3056534 | | 9/2018 |
| CN | 2767068 | Y | 3/2006 |
| CN | 3630254 | | 6/2006 |
| CN | 201046555 | Y | 4/2008 |
| CN | 101208181 | A | 6/2008 |
| CN | 102395447 | | 3/2012 |
| CN | 102554833 | A | 7/2012 |
| CN | 203197845 | | 9/2013 |
| CN | 103639950 | A | 3/2014 |
| CN | 303924849 | | 11/2016 |
| CN | 303956827 | | 12/2016 |
| CN | 303984883 | | 12/2016 |
| CN | 107378843 | | 11/2017 |
| CN | 207548606 | U | 6/2018 |
| CN | 110871416 | A | 3/2020 |
| DE | 3911409 | A1 | 10/1990 |
| DE | 9403220 | U1 | 4/1994 |
| DE | 4321325 | A1 | 1/1995 |
| DE | 29613327 | U1 | 9/1996 |
| DE | 10321284 | A1 | 12/2004 |
| DE | 202010006146 | U1 | 7/2010 |
| DE | 202012103034 | | 11/2012 |
| DE | 102012104298 | A1 | 11/2013 |
| DE | 102013021238 | A1 | 6/2015 |
| EP | 0930132 | A2 | 7/1999 |
| EP | 0930132 | A3 | 11/2000 |
| EP | 1371453 | A2 | 12/2003 |
| EP | 1731774 | A1 | 12/2006 |
| EP | 0930132 | B1 | 4/2007 |
| EP | 2363245 | | 9/2011 |
| EP | 2363245 | A2 | 9/2011 |
| EP | 2363245 | A3 | 7/2015 |
| GB | 906839 | A | 9/1962 |
| GB | 1294764 | A | 11/1972 |
| GB | 2366532 | A | 3/2002 |
| JP | H06-15580 | | 1/1994 |
| JP | H0737805 | | 4/1995 |
| JP | 2011143522 | | 7/2011 |
| JP | 2012157913 | | 10/2011 |
| JP | 2014100742 | | 6/2014 |
| JP | 2015180835 | A | 7/2017 |
| JP | 2022501205 | | 1/2022 |
| KR | 200149097 | Y1 | 7/1999 |
| RU | 2152870 | C1 | 7/2000 |
| RU | 2225786 | C2 | 1/2001 |
| RU | 45671 | U1 | 5/2005 |
| RU | 58510 | U1 | 11/2006 |
| RU | 2387533 | C1 | 4/2010 |
| RU | 116398 | | 5/2012 |
| RU | 180548 | U1 | 6/2018 |
| SU | 16616 | A1 | 8/1930 |
| TW | 362059 | | 6/1999 |
| TW | 201341127 | A | 10/2013 |
| TW | M476029 | | 4/2014 |
| TW | M517076 | | 2/2016 |
| TW | 201617181 | A | 5/2016 |
| TW | M568761 | | 10/2018 |
| WO | 1994016862 | A1 | 8/1994 |
| WO | 1996010932 | A1 | 4/1996 |
| WO | 1996026870 | A1 | 9/1996 |
| WO | 1996027745 | A1 | 9/1996 |
| WO | 1997010926 | A1 | 3/1997 |
| WO | 1998012982 | A1 | 4/1998 |
| WO | 999032264 | | 7/1999 |
| WO | 1999032264 | A1 | 7/1999 |
| WO | 2001066312 | A1 | 9/2001 |
| WO | 2004002687 | A1 | 1/2004 |
| WO | 2005070621 | | 8/2005 |
| WO | 2006023374 | | 3/2006 |
| WO | 2006130490 | A1 | 12/2006 |
| WO | 2010007402 | A1 | 1/2010 |
| WO | 2011109040 | A1 | 9/2011 |
| WO | 2013028875 | A1 | 2/2013 |
| WO | 2014099954 | | 6/2014 |
| WO | 2015082283 | A1 | 6/2015 |
| WO | 2015050942 | A1 | 9/2015 |
| WO | 2016051080 | A1 | 4/2016 |
| WO | DM/090809 | | 4/2016 |
| WO | DM/091188 | | 5/2016 |
| WO | DM/091189 | | 5/2016 |
| WO | 2016174615 | A1 | 11/2016 |
| WO | WO2017069953 | A1 | 4/2017 |
| WO | 2017178997 | | 10/2017 |
| WO | 2017187388 | A1 | 11/2017 |
| WO | 2018150360 | A1 | 8/2018 |
| WO | 2018172831 | | 9/2018 |
| WO | 2019012486 | | 1/2019 |
| WO | 2019167032 | | 9/2019 |
| WO | 2019175652 | | 9/2019 |
| WO | 2020039281 | | 2/2020 |
| WO | 2020039285 | | 2/2020 |
| WO | 2020058777 | | 3/2020 |
| WO | 2020152516 | | 7/2020 |
| WO | 2020208608 | | 10/2020 |
| WO | 2020225800 | | 11/2020 |

(56) References Cited

FOREIGN PATENT DOCUMENTS

| | | | |
|---|---|---|---|
| WO | 2021001696 | | 1/2021 |
| WO | 2021019500 | | 2/2021 |
| WO | 2021033152 | | 2/2021 |
| WO | 2022047236 | A1 | 3/2022 |
| WO | 2022103566 | | 5/2022 |
| WO | 2023230168 | | 11/2023 |

* cited by examiner

METHODS AND APPARATUSES FOR DISLODGING FOREIGN OBJECTS FROM FASTENER EXTRACTORS

FIELD OF THE INVENTION

The present invention relates generally to tools and methods for extracting or removing fasteners, in particular bolts and nuts. More specifically, the present invention discloses methods for using two engaging tool bodies that collectively remove jammed foreign objects from tools used for extracting or removing fasteners.

BACKGROUND OF THE INVENTION

Hex bolts, nuts, screws, and other similar threaded devices are used to secure and hold multiple components together by being engaged to a complimentary thread or the actual material itself. Bolt and screws have generally structure of a cylindrical shaft with an external thread and a head at one end of the shaft. Nuts are generally shaped into cylindrical bodies with an internal thread. When a socket and wrench is used to remove these kinds of threaded devices, often times the threaded devices can get jammed into the socket thus resulting difficulties to separate them from the socket. The present invention functions as a foreign object removal system adaptor so that the jammed threaded devices from the socket can be easily dislodged.

The object of the present invention is to provide a method for removing any foreign jammed devices from the socket without damaging the socket in any way. Moreover, the present invention is versatile in the sense that the present invention can be used for any shape, size, or orientation of sockets. The present invention is a removal method that virtually eliminates the chance of socket or threaded devices to be damaged. The present invention uses two components which work together in order to extract the foreign object jammed in the socket.

DETAIL DESCRIPTIONS OF THE INVENTION

All illustrations of the drawings are for the purpose of describing selected versions of the present invention and are not intended to limit the scope of the present invention.

Figure 1:
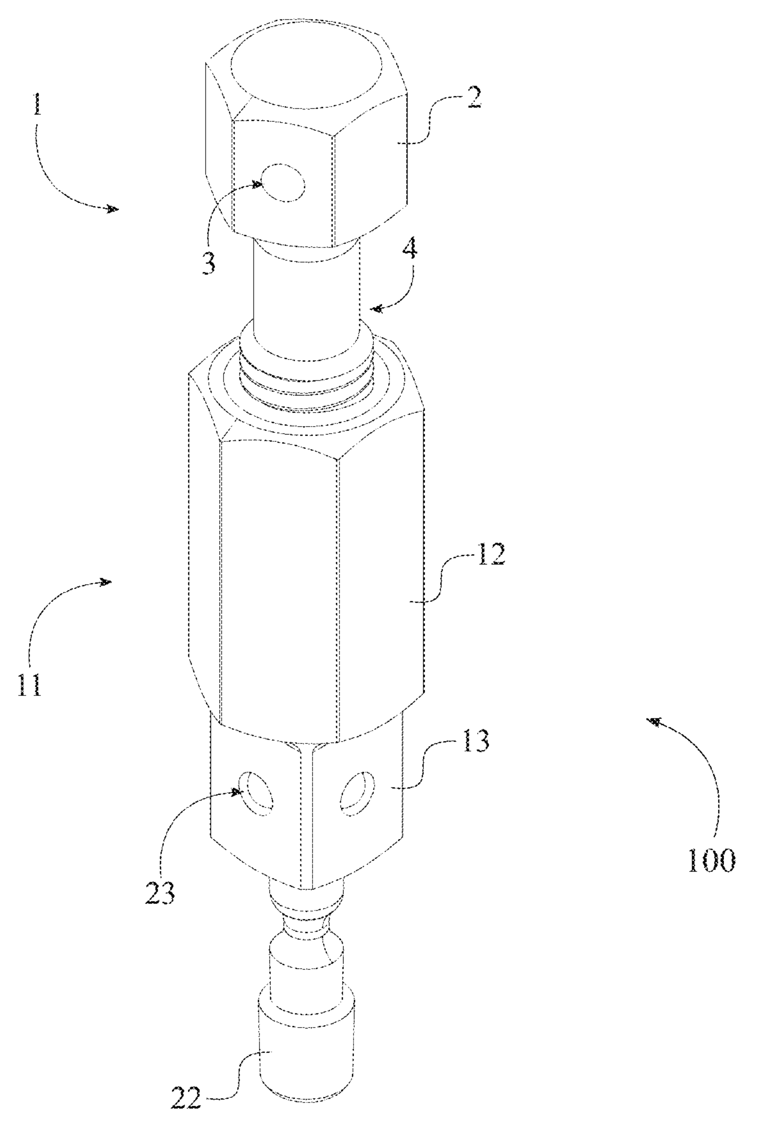
FIG. 1 is a top perspective view of the foreign object removal system adaptor (FORSA) of the present invention.
Figure 2:
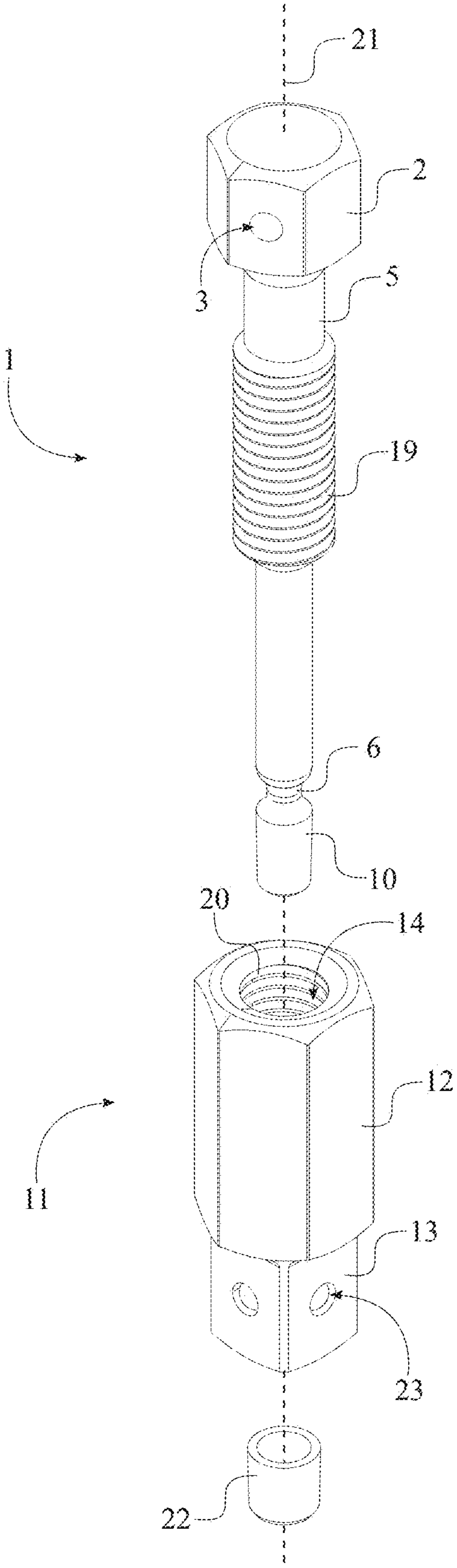
FIG. 2 is an exploded view of the FORSA of the present invention along the rotational axis.

The apparatus of the present invention is a foreign object removal system adaptor (FORSA) 100 so that the utilization of the FORSA is able to push out any foreign object out of the socket. The FORSA 100 comprises a pusher 1, an adaptor 11, an external thread 19, an internal thread 20, and a stop 22 as shown in FIG. 1-2. The pusher 1 that pushes out the foreign object FO from the socket comprises a drive head 2 and a main shaft 4. The adaptor 11 that concentrically aligns and mounts the pusher 1 with the socket comprises a tool body 12, a socket attachment body 13, and a main channel 14.

In reference to a general configuration of the FORSA 100 of the present invention, the pusher 1, the adaptor 11, the external thread 19, and the internal thread 20 are concentrically positioned around a rotational axis 21 of the present invention as shown in FIG. 1-2. The drive head 2 and the main shaft 4 are adjacently connected to each other thus delineating the overall structure of the pusher 1. In the preferred embodiment, the pusher 1 is constructed from one piece, wherein the drive head 2 is terminally connected to the main shaft 4. However, in an alternative embodiment, the pusher 1 may be constructed from more than one piece. The stop 22 is radially connected around the main shaft 4 and positioned opposite of the drive head 2. The tool body 12 and the socket attachment body 13 are adjacently connected to each other thus delineating the overall structure of the adaptor 11. The main channel 14 concentrically traverses through the tool body 12 and the socket attachment body 13 in order to facilitate the engagement of the pusher 1. The external thread 19 is laterally connected around the main shaft 4. The internal thread 20 is laterally connected within the main channel 14. As a result, the main shaft 4 is able to threadedly engage with the main channel 14 through the external thread 19 and the internal thread 20 thus allowing the main shaft 4 to selectively exits about the socket attachment body 13. The socket attachment body 13 functions as the connecting member so that the present invention can be mounted to the socket. Once torque is applied to the drive head 2, the main shaft 4 that is engaged within the main channel 14 is able to emerge through the socket attachment body 13 thus pushing out the foreign objects from the socket.

Figure 3:
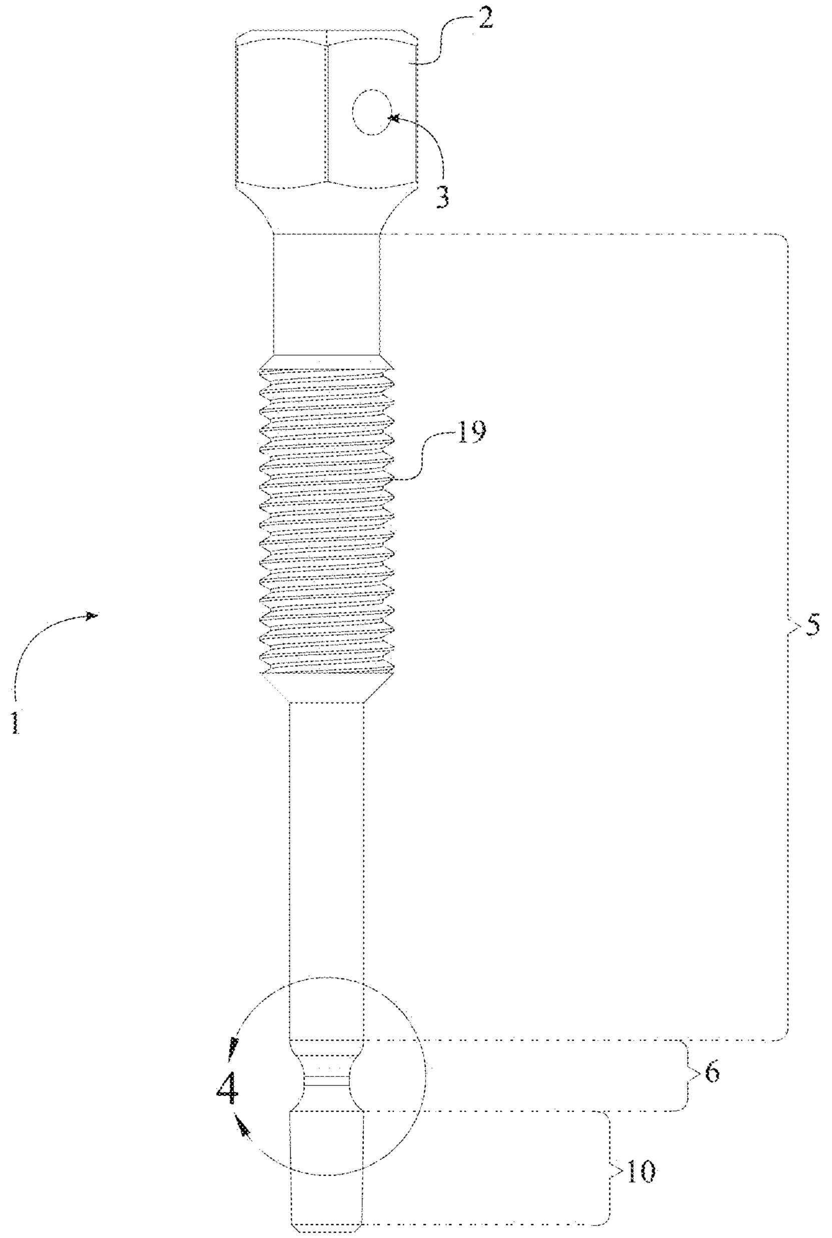
FIG. 3 is a side view of the pusher of the present invention.

In reference to FIG. 1-3, the drive head 2 is a physical structure that is used to apply torque. The drive head 2 is preferably formed into a hexagonal shaped structure but can be a square shape or any other viable shape that permits the application of torque. In the preferred embodiment of the present invention, the drive head 2 allows the user to apply torque to the main shaft 4 in either clockwise direction or counterclockwise direction. A diameter of the drive head 2 is larger than a diameter of the main shaft 4 so that the drive head 2 can act as a stopper for the pusher 1 as the main shaft 4 cannot be completely removed or fully emerged through the socket attachment body 13. Alternatively, a band or protrusion may be attached or mounted to the main shaft to provide a stop. The drive head 2 can be rotated using any existing torque tools or drivers including ratchets, pneumatic drivers, drills, impact drivers, wrenches and any other socket attachments or driving mechanisms.

In reference to FIG. 3, the pusher 1 further comprises a torque-applying opening 3. More specifically, the torque-applying opening 3 laterally traverses through the drive head 2 and is oriented perpendicular to the main shaft 4. The torque-applying opening 3 is preferably formed into a circular shape; however, the torque-applying opening 3 is not limited to the circular shape and can be any other geometrical shape within the present invention. The torque-applying opening 3 accepts a matching shaped shaft 45 for applying torque when the pusher 1 is rotated by the user's hand. When the matching shaped shaft 45 is fitted into the torque-applying opening 3, the matching shaped shaft 45 acts as a handle for the drive head 2 so that an ergonomic grip can be provided for the user's hand to apply torque. The matching shaped shaft may further comprise a retaining body to temporarily retain the matching shaped shaft within the torque-applying opening 3 and prevents from falling out during usage.

The main shaft 4 is a rod-like structure and fitted into the main channel 14 so that the foreign object can be pushed out from the socket. In reference to FIG. 3, the main shaft 4 comprises an elongated section 5, a recessed section 6, and a tip section 10. The elongated section 5 and the tip section 10 are oppositely positioned of each other about the recessed section 6, wherein the elongated section 5, the recessed section 6, and the tip section 10 are concentrically positioned along the rotational axis 21. In order to delineate the rod-like structure, the elongated section 5 terminally connected to the recessed section 6. The tip section 10 is terminally connected to the recessed section 6. The drive head 2 is terminally connected to the elongated section 5 and positioned opposite of the recessed section 6 so that the tip portion and the recessed portion can be positioned adjacent to the socket attachment body 13. The elongated section 5 and the tip section 10 are preferably parallel and on the same plane but may be offset by different diameters or by tapering the elongated section 5 and/or the tip section 10. It is noted that once the main shaft 4 has been engaged with the adapter 11 as the corresponding parts are designed to be permanently engaged with each other.

The elongated section 5 is a cylindrical shaft so that the pusher 1 can be engaged within the main channel 14. More specifically, the external thread 19 is laterally connected around the elongated section 5 and positioned in between the recessed section 6 and the drive head 2. In other words, the external thread 19 is partially extended along the elongated section 5 wherein a length of the external thread 19 is preferably smaller than a length of the elongated section 5; however in some embodiment, the external thread 19 may be the same length or longer in length than the elongated section 5. The diameter of the portion of the elongated section 5 between the recessed section 6 and the external thread 19 is preferably less than or equal to the diameter of the external thread 19 but not greater than the diameter of the external thread 19. In the preferred embodiment of the present invention, the external thread 19 is a male-type thread; however, in an alternative embodiment of the present invention, the external thread 19 can be a female-type thread.

Figure 10:
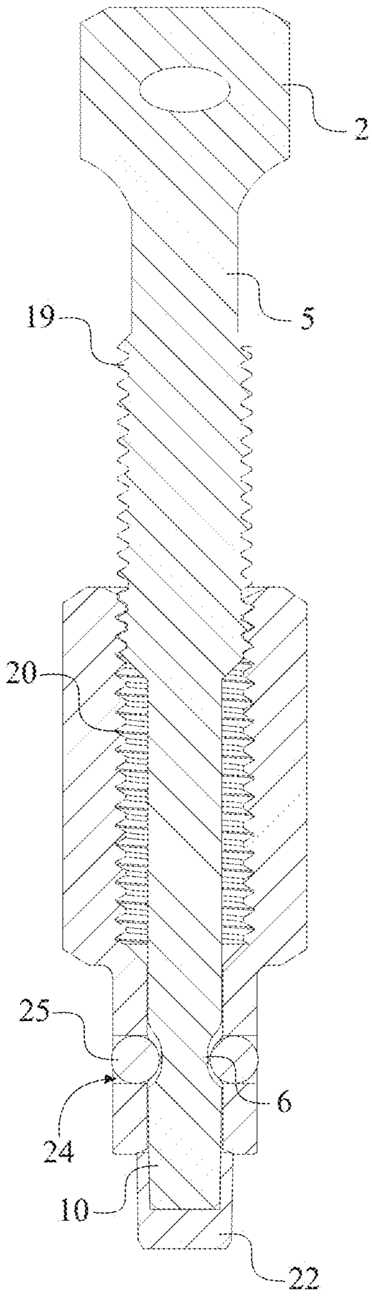
FIG. 10 is a cross section view of the FORSA of the present invention taken along line 10-10 of FIG. 9.
Figure 11:
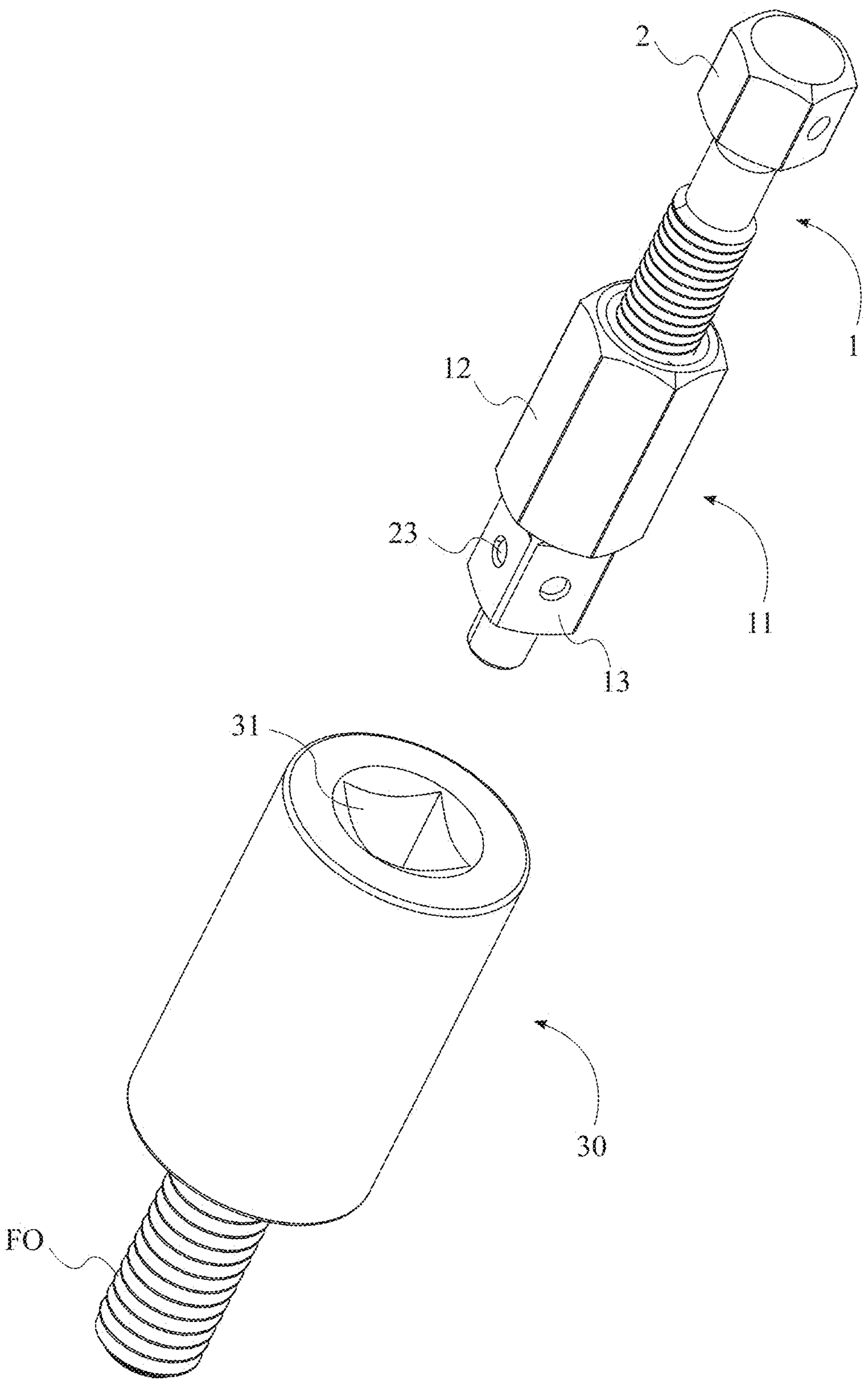
FIG. 11 is a top perspective view of the present invention, showing the FORSA detached from the socket.

The stop 22 functions as a stopper for the pusher 1 so that the pusher 1 does not disengage about the tool body 12. In reference to FIG. 10, the stop 22 is connected to the tip section 10 so that the stop 22 can be pressed against the socket attachment body 13. In some embodiments, as shown in FIG. 10, the stop 22 is radially connected around the tip section 10. More specifically, an outer diameter of the stop 22 is slightly larger than the channel about the socket attachment body 13 and slightly smaller than the outer diameter of the socket attachment body 13. For embodiments in which the stop 22 is not circular, it is preferred that the stop be of a size larger than the channel about the socket engagement body 13 and smaller than the socket engagement body 13. This size for the stop 12 prevents the stop 12 from passing through the channel about the socket attachment body 13 while being small enough not to obstruct the exterior of the socket attachment body 13. As a result, the stop 22 is able to press against the socket attachment body 13 thus preventing the pusher 1 from disengaging from the adaptor 11. Alternatively, the stop 22 can be designed to fit permanently over the tip section 10. Alternatively, the stop 22 can be further integrated with an aperture at a top base of the stop 22 that is sized to match the diameter of the tip section 10. A bottom base of the stop 22 is preferably flat but may be a convex or concave shape if preferred. A sidewall of the stop 22 may be straight or tapered. Alternative components may be used as a stopper in lieu of the stop 22 including, but are not limited to, a spring ring, pin, protrusion, annular flange, cap, or collet. Furthermore, the tip section 10 may be manufactured in alternative methods thus providing a larger diameter tip than a bottom channel section 16 of the main channel 14 without the need to attach the stop 22 or the tip section 10 may be smaller in diameter than the bottom channel 16 if preferred.

Figure 4:
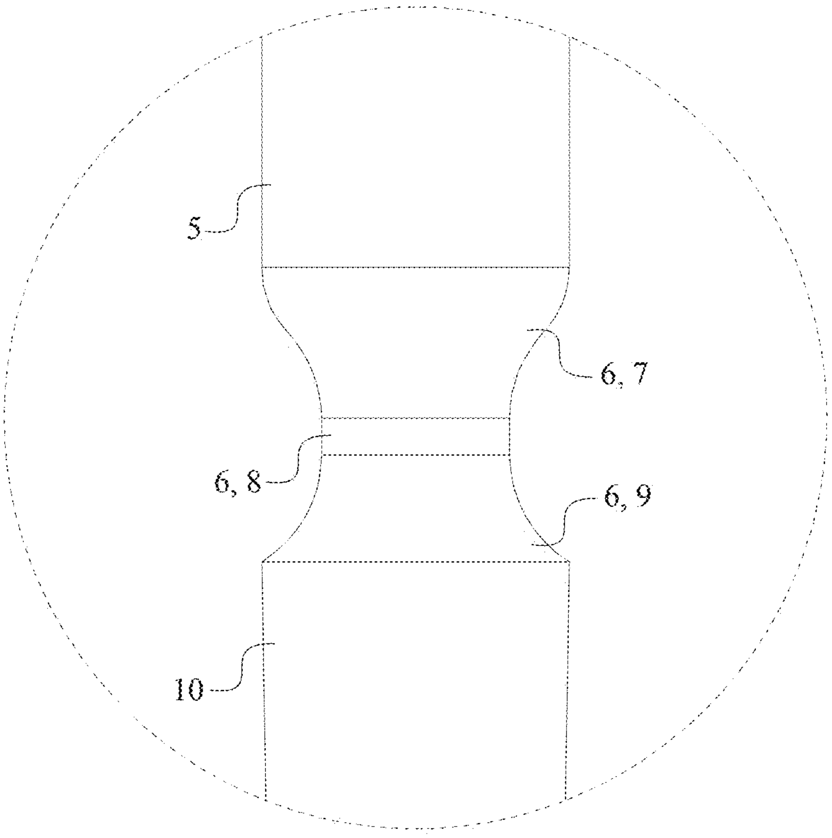
FIG. 4 is a detailed view of the recessed section of the pusher of the present invention.

The recessed section 6 functions as an engaging/disengaging feature between the socket attachment body 13 and the socket so that the present invention can be easily attached or removed from the socket. In reference to FIG. 4, the recessed section 6 comprises a first tapered section 7, a flat section 8, and a second tapered section 9. More specifically, the first tapered section 7 and the second tapered section 9 are oppositely positioned of each other about the flat section 8. The first tapered section 7 is terminally connected to the elongated section 5 and the flat section 8. The second tapered section 9 is terminally connected to the tip section 10 and the flat section 8. The first tapered section 7, a flat section 8, and a second tapered section 9 may vary in length and ratio to each other. Furthermore, the recessed section 6 is configured to relieve pressure from at least one retaining assembly 23 of the present invention so that the socket can be easily removed from the socket attachment body 13.

The retaining assembly 23 functions as a fastening mechanism within the present invention so that socket can be locked and unlocked from the socket attachment body 13.

The retaining assembly 23 comprises a cavity 24 and a retaining body 25. In one embodiment, the retaining body 25 is a spherical ball bearing, as shown in FIG. 7-10. The cavity 24 laterally traverses into the main channel 14 through the socket attachment body 13 and oriented perpendicular to the main channel 14. In this arrangement, the retaining assembly 23 is operably connected to the pusher 2. More specifically, the retaining body 25 is engaged within the cavity 24 so that up and down movement of the main shaft 4 is able to control the lateral movement of the retaining body 25 within the retaining assembly 23. For example, when the socket has to be disengaged from the socket attachment body 13, the recessed section 6 of the main shaft 4 has to be aligned with the cavity 24 to relieve pressure from the retaining body 25 as shown in FIG. 10. When the pusher 1 is utilized to push out foreign object out of the socket, the recessed section 6 is positioned offset from the cavity 24. Resultantly, the elongated section 5 outwardly applies pressure to the retaining body 25 thus engaging and securing the socket with the socket attachment body 13 via the retaining body 25. It is considered obvious alternative embodiments of the present invention may use pins, spring rings, circular ring style expanding mechanisms or any other components able to function within the scope of the present invention that are integrated into the main shaft 4 instead of the retaining body 25.

Preferably, the first tapered section 7 and the second tapered section 9 may be concave or convex in order to ease the lateral movement of the retaining body 25. Additionally, the first tapered section 7 and the second tapered section 9 may be straight sections that are angularly positioned with respect to the flat section 8. As a result, the retaining body 25 is able to gradually move in and out of the cavity 24 as concave, convex, or straight section when the recessed section 6 applies pressure to the retaining body 25. Similarly, the flat section 8 is preferably a flat surface but may be a concave or convex surface.

Furthermore, the intersecting point between the recessed section 6 and the elongated section 5 can be a sharp corner or a smooth radial corner as preferred by the user or the manufacture. Similarly, the intersecting point between the recessed section 6 and the tip section 10 can be a sharp corner or a smooth radial corner as preferred by the user or the manufacture.

In the preferred embodiment of the present invention, the tool body 12 is hexagonal in shape but can be of any other viable shapes or forms including but not limited to square or circular. The hexagonal shape allows the tool body 12 to be easily engaged with existing wrenches and other similar tools so that the tool body 12 can be stationary while the pusher 1 is rotated about the rotational axis 21.

In the preferred embodiment of the present invention, the socket attachment body 13 is shaped to a drive square of a ratchet so that any existing socket can be easily attached to the socket attachment body 13. However, the socket attachment body 13 is not limited to the drive square shape and can be any other types of geometrical shape that facilitate the attachment of any existing socket or other embodiments able to use the function of the present invention.

Figure 5:
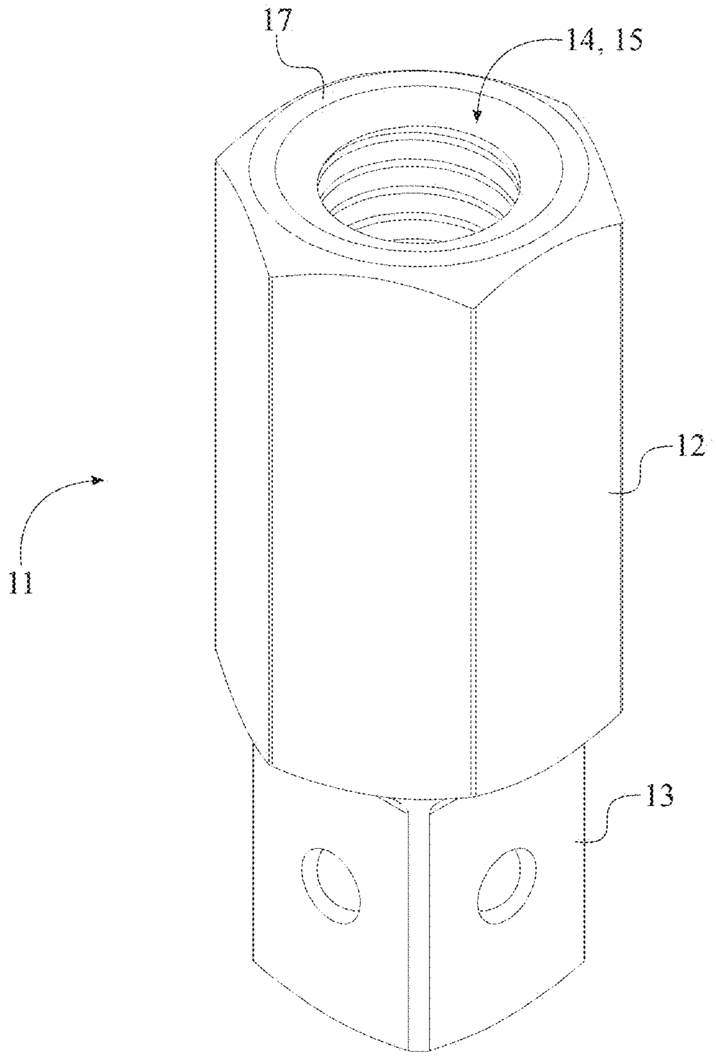
FIG. 5 is a top perspective view of the adaptor of the present invention.
Figure 6:
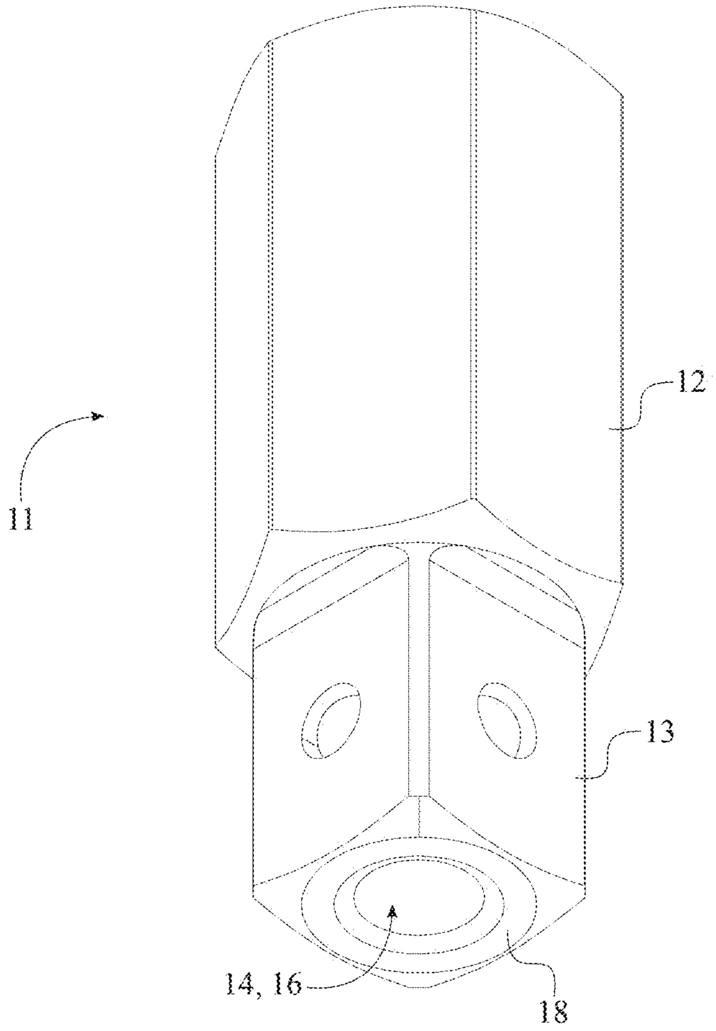
FIG. 6 is a bottom perspective view of the adaptor of the present invention.
Figure 7:
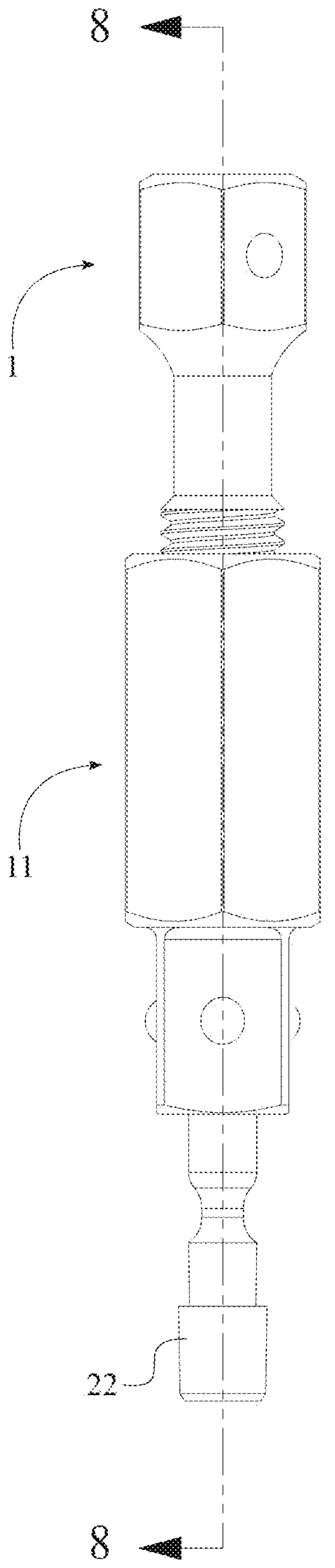
FIG. 7 is a front view of the FORSA of the present invention, wherein the retaining body is outwardly pushed by the elongated section to lock the socket, showing the plane upon which a cross sectional view is taken.
Figure 8:
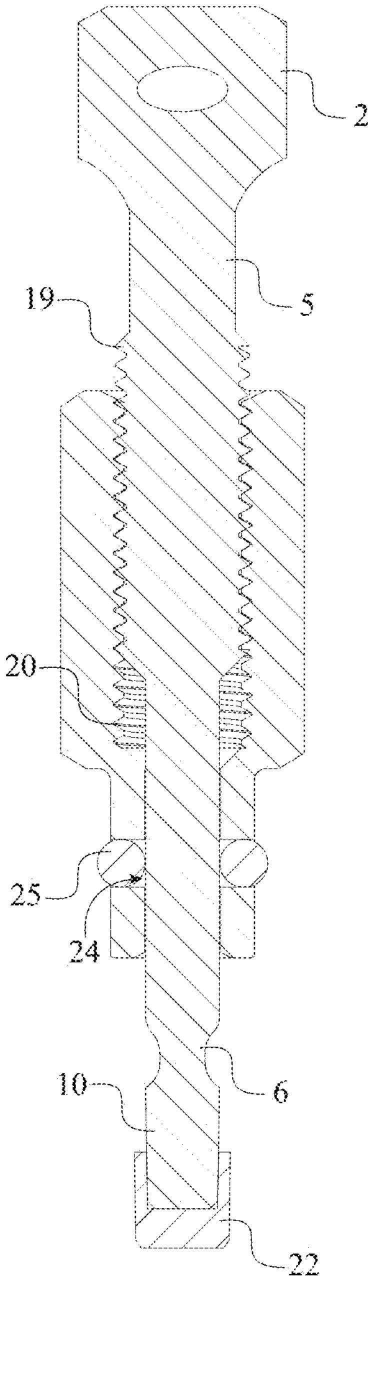
FIG. 8 is a cross section view of the FORSA of the present invention taken along line 8-8 of FIG. 7.
Figure 9:
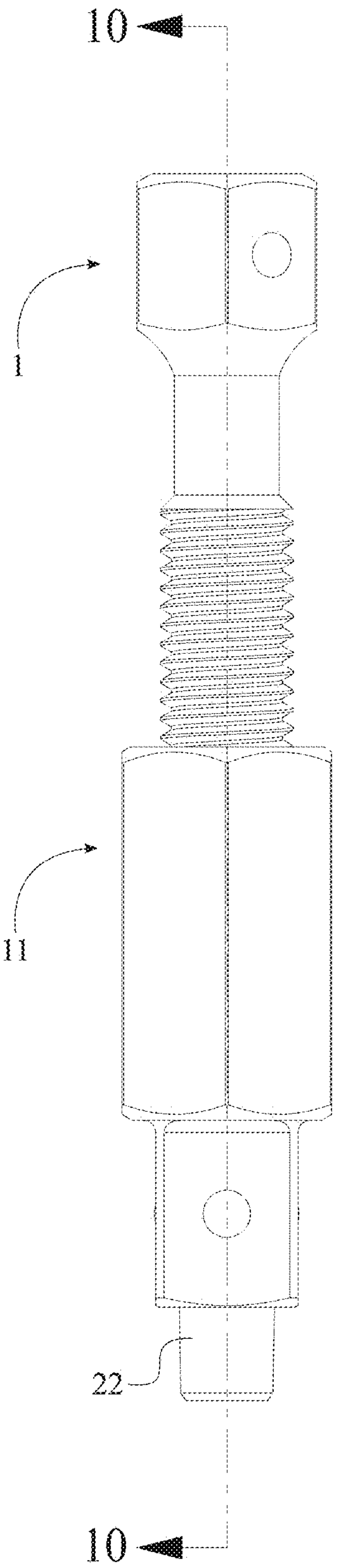
FIG. 9 is a front view of the FORSA of the present invention, wherein the retaining body is neutrally positioned within the cavity due to the placement of the recessed section to release the socket, showing the plane upon which a cross sectional view is taken.

The main channel 14 that facilitates the movement of the main shaft 4 comprises a top channel section 15 and the bottom channel section 16 as shown in FIG. 5-6. The top channel section 15 traverses from a top base 17 of the adaptor 11 and through the entire length of the tool body 12. The bottom channel section 16 traverses from a bottom base 18 of the adaptor 11 and through the entire length of the socket attachment body 13. As a result, the top channel section 15 is intersected with the bottom channel section 16 about the socket attachment body 13 thus dividing the main channel 14 into two different sections. Furthermore, a diameter of the top channel section 15 is larger than a diameter of the bottom channel section 16 so that sufficient tolerance can be provided for the external thread 19 with respect to the tool body 12 and main shaft 4 with respect to the socket attachment body 13. Additionally, the outer diameter of the stop 22 is slightly larger than the diameter of the bottom channel section 16 so that the stop 22 can be pressed against the bottom base 18.

The internal thread 20 is extended along the top channel section 15 and resides along the channel surface of the top channel section 15. As a result, a termination point for the internal thread 20 that is positioned adjacent to the socket attachment body 13 functions as a stop for the elongated section 5. This stop further controls and/or limits the depth the elongated section 5 can be inserted within the top channel section 15. The preferred embodiment, the internal thread 20 is a female-type thread; however, in an alternative embodiment of the present invention, the internal thread 20 can be a male-type thread. The internal thread 20 is utilized within the present invention to threadedly engage with the external thread 19.

In an alternative embodiment of the main channel 14, the top channel 15 may be smaller in diameter than the bottom channel 16, the same diameter as bottom channel 16, or the bottom channel 16 may be larger in diameter than the top channel 15.

In reference to FIGS. 11-18, the present invention can be used to remove stuck objects from a socket without having to use a punch or vise. This reduces the chance of injury to the user and damage to the socket. To that end, a method for using the foreign object removal system adaptor (FORSA) 100 of the present invention comprises the following steps: First, prior to using the FORSA 100, an adaptor 11 must be chosen such that the socket attachment body 13 properly fits the socket 30 to be removed. Choosing the correct adaptor 11 for a specific socket generally requires matching the size of the drive square protrusion of the socket attachment body 13 with the drive square cavity of a socket 30 so that any existing socket can be easily attached to the socket attachment body 13. However, the socket attachment body 13 is not limited to the drive square shape and can be any other types of geometrical shape that facilitate the attachment of any existing socket or other embodiments able to use the function of the present invention.

Figure 14:
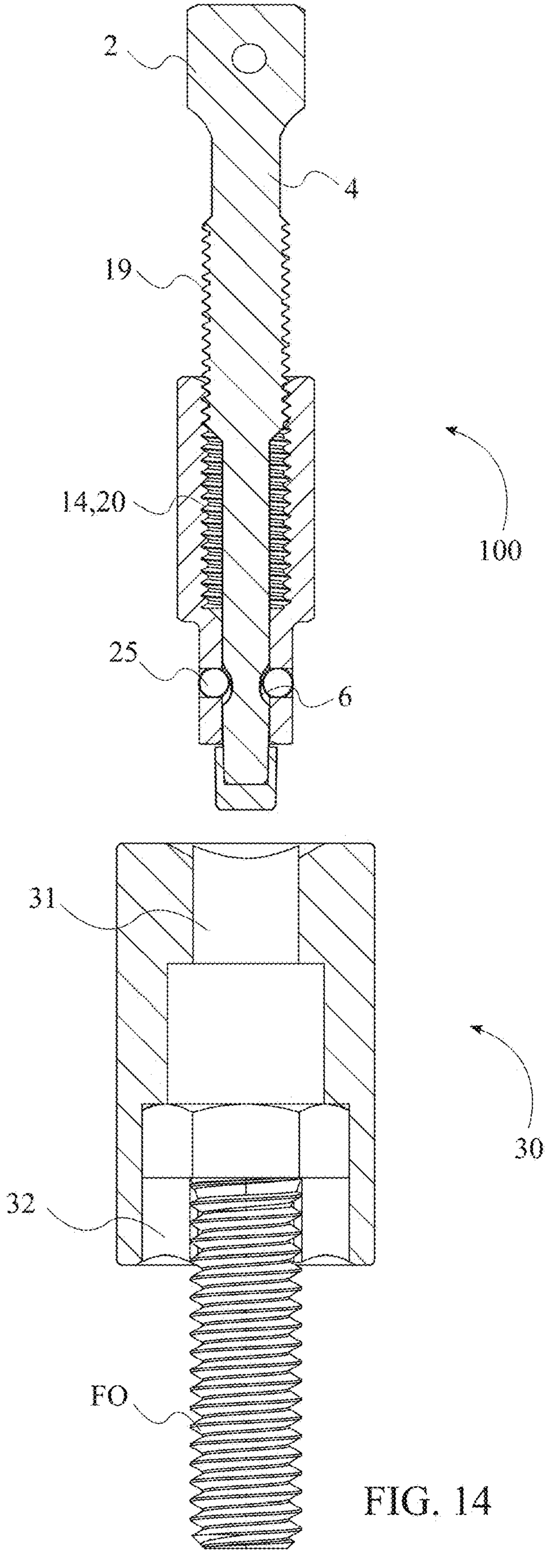
FIG. 14 is a front cutaway view of the present invention, showing the FORSA detached from the socket.
Figure 15:
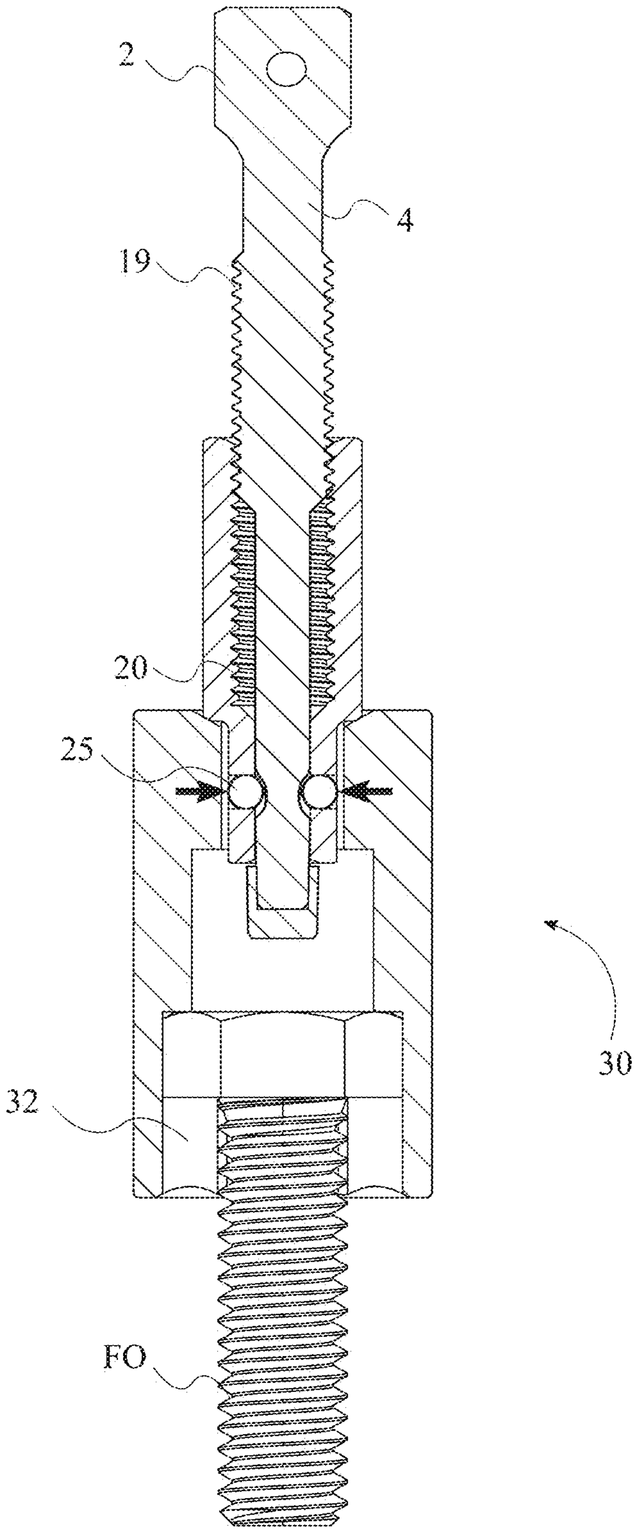
FIG. 15 is a front cutaway view of the present invention, showing the FORSA attached to the socket in an unlocked position.

Once an embodiment of the adaptor 11 is chosen, the socket attachment body 13 of the adaptor 11 is engaged with the drive end 31 of the socket 30. Preferably, as seen in FIG. 14, the socket attachment body 13 is pre-configured in the unlocked position, wherein the recessed section 6 of the pusher 1 is aligned with the cavity 24 of the retaining assembly 23. Next, as seen in FIG. 15, the user may then slidably connect the socket attachment body 13 to the drive end 31 of the socket 30.

Figure 12:
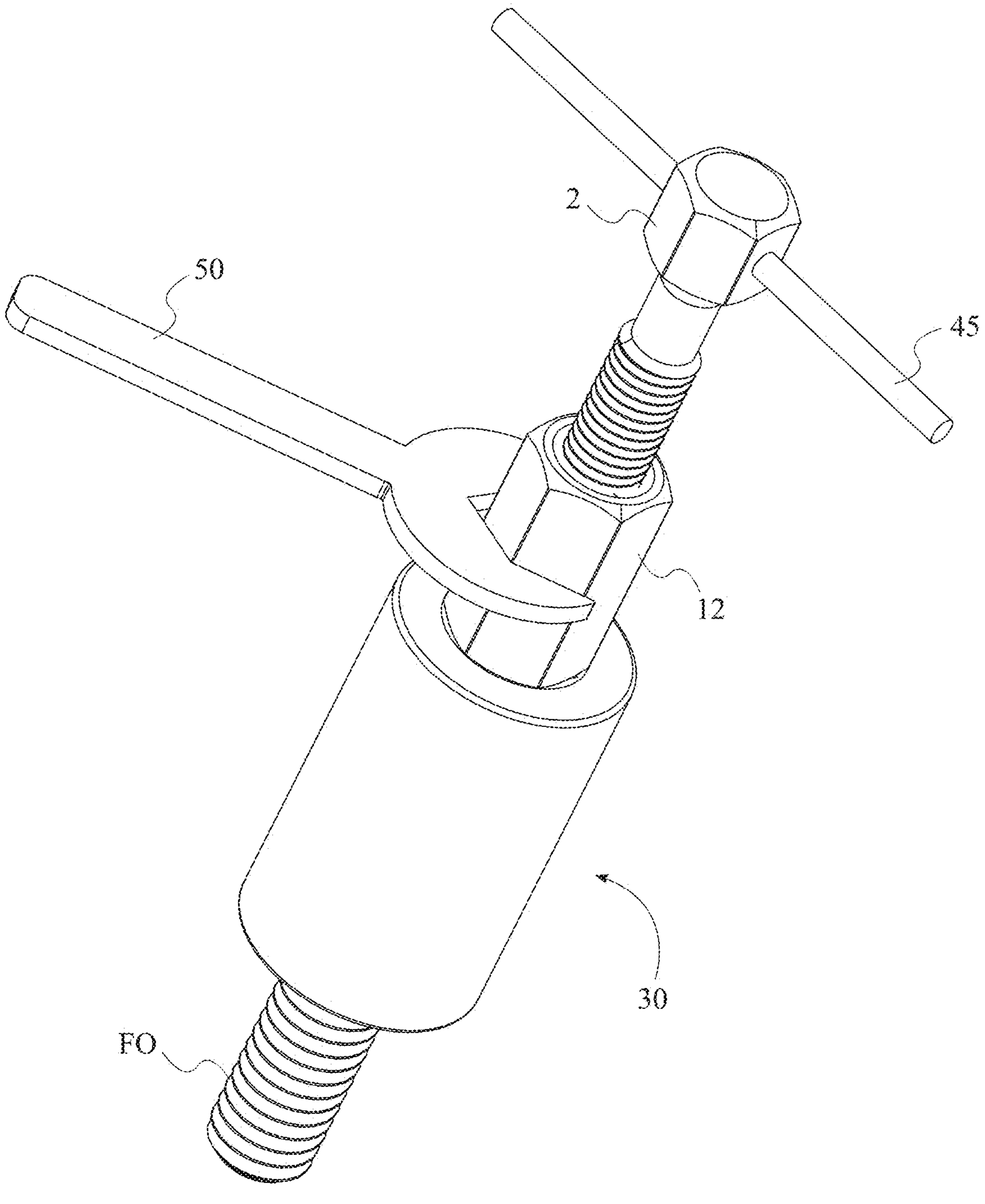
FIG. 12 is a top perspective view of the present invention, showing the FORSA attached to the socket in accordance with a first embodiment.
Figure 13:
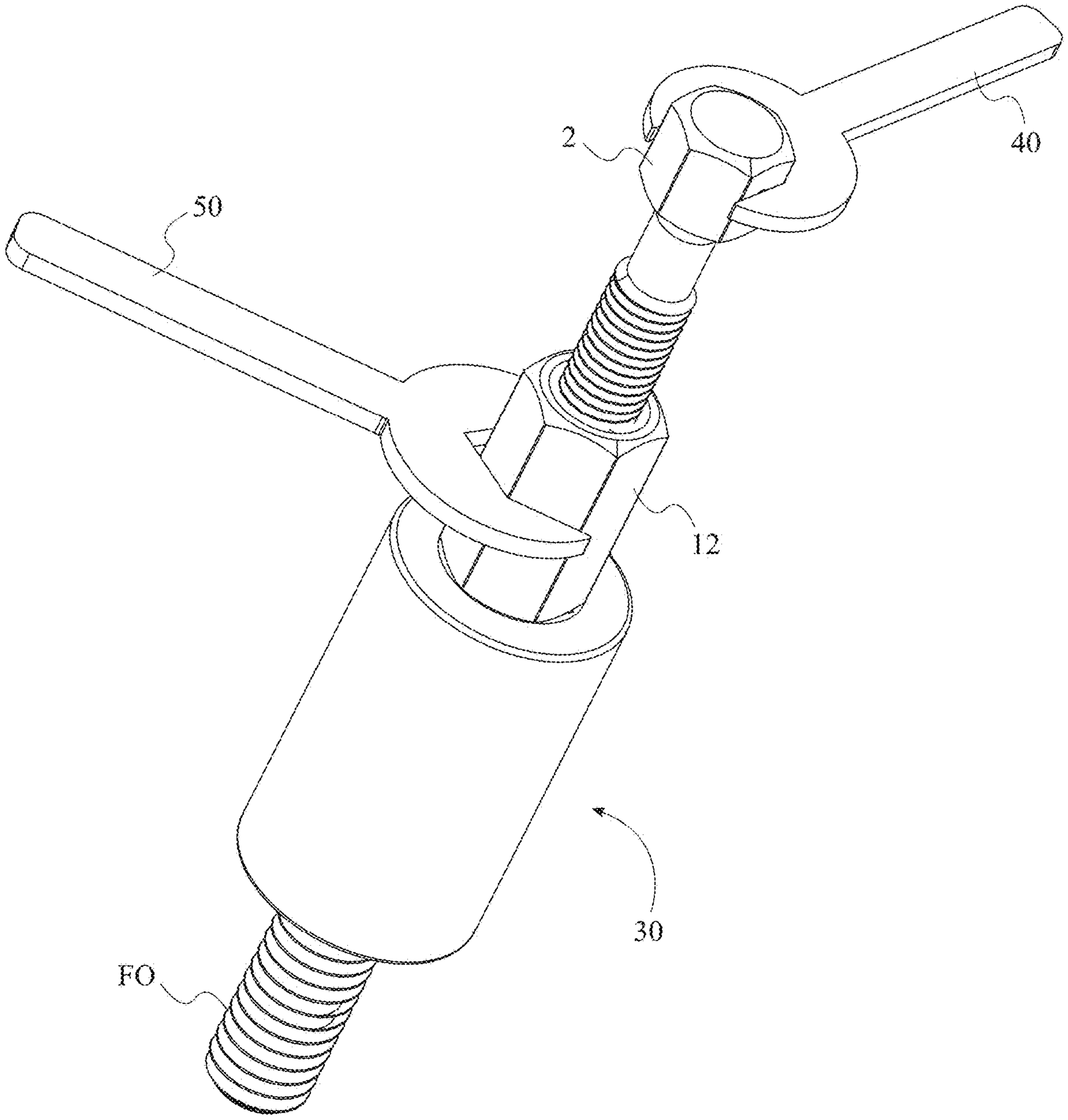
FIG. 13 is a top perspective view of the present invention, showing the FORSA attached to the socket in accordance with a second embodiment.

To move into the locked position, the user may threadedly engage the main shaft 4 of the pusher 1 with the main channel of 14 of the adaptor 11. Thereafter, the user may engage the retaining assembly 23 by applying appropriate clockwise or counterclockwise torque to the drive head 2 in the tightening direction until the recessed section 6 is misaligned with the cavity 24 of the retaining assembly 23. As seen in FIG. 12, this torque may be applied by hand using the torque-applying opening 3 and a matching shaped shaft 45. In this embodiment, the matching shaped shaft 45 is fitted into the torque-applying opening 3 and the user applies lateral force to the matching shaped shaft 45. In the preferred embodiment, as seen in FIG. 13, this torque may be applied through the use of a first external torque tool 40, wherein the user applies lateral force to the first external torque tool 40. Resultantly, the elongated section 5 of the pusher 1 outwardly applies pressure to the retaining body 25, thus engaging and securing the socket 30 to the socket attachment body 13 via the retaining body 25. Most sockets 30 on the market today have a D dent for engagement with the retaining assembly 23.

Figure 16:
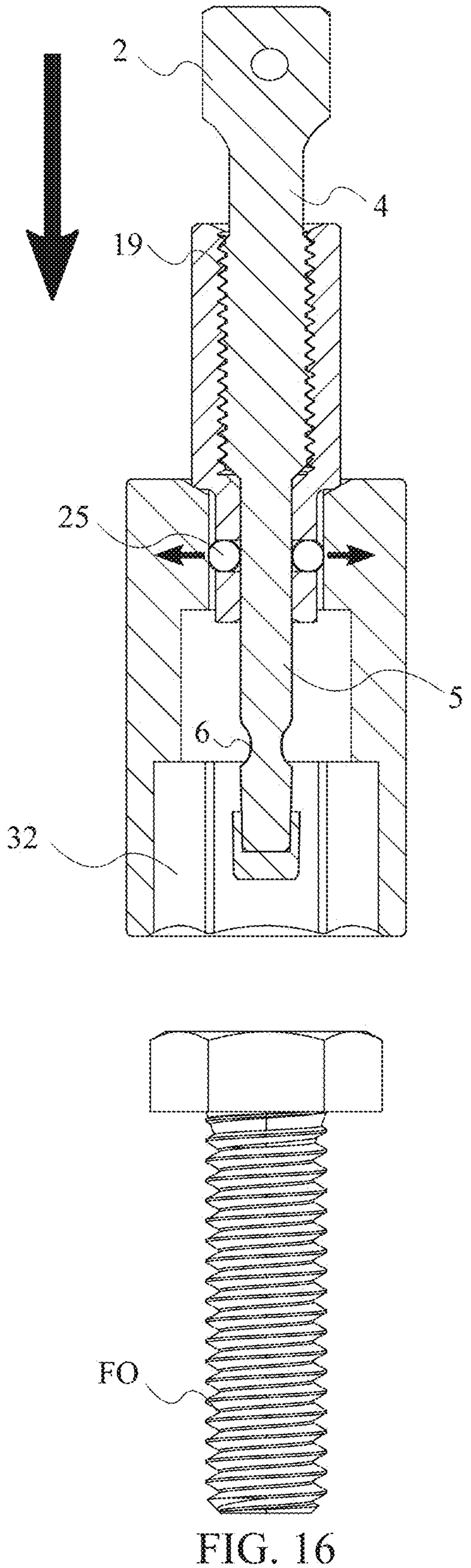
FIG. 16 is a front cutaway view of the present invention, showing the FORSA in a locked position and the main shaft is extended downward to push out the foreign object.

After securing the socket 30 to the socket attachment body 13, the user can then perform the subsequent steps of removing the foreign object FO from the socket 30. As seen in FIG. 16, the user may continue to apply rotational force to the drive head 2 while holding the adaptor 11 in a fixed position, thereby moving the main shaft 4 of the pusher 1 axially along the internal thread 20 and through the socket attachment body 13, thus pushing out the foreign object FO from the socket opening 32.

In many cases, the foreign object FO will be tightly engaged with the socket opening 32, requiring greater rotational force on the adaptor 11 than can be readily applied by a user's hands. Thus, a second external torque tool 50 may be engaged with the adaptor 11 to apply greater rotational force to the drive head 2. As seen in FIG. 12, the matching shaped shaft 45 is engaged with the drive head 2 and the second external torque tool 50 is engaged with the tool body 12 of the adaptor 11. Then, torque is simultaneously applied in opposite lateral directions to the matching shaped shaft 45 and the second external torque tool 50. Rotation of the pusher 1 along the internal thread 20 moves the pusher 1 axially along the rotational axis 21 of the FORSA 100, pressing the foreign object FO away from the FORSA 100 and dislodging the foreign object FO from the socket 30.

In the preferred embodiment, as seen in FIG. 13, the first external torque tool 40 is engaged with the drive head 2 and the second external torque tool 50 is engaged with the tool body 12 of the adaptor 11. Then, torque is simultaneously applied in opposite lateral directions to the first external torque tool 40 and the second external torque tool 50.

Figure 17:
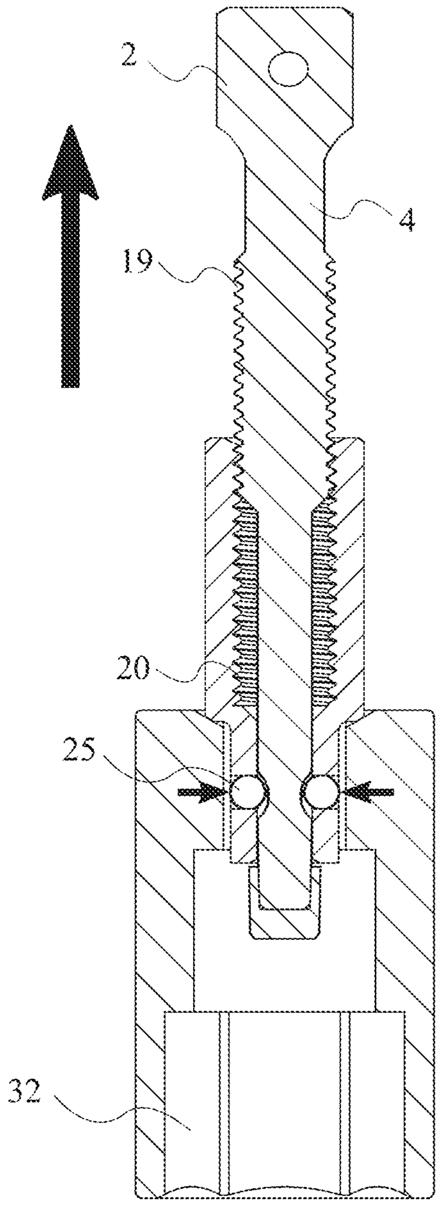
FIG. 17 is a front cutaway view of the present invention, showing the main shaft retracted upward and the FORSA is returned to an unlocked position.
Figure 18:
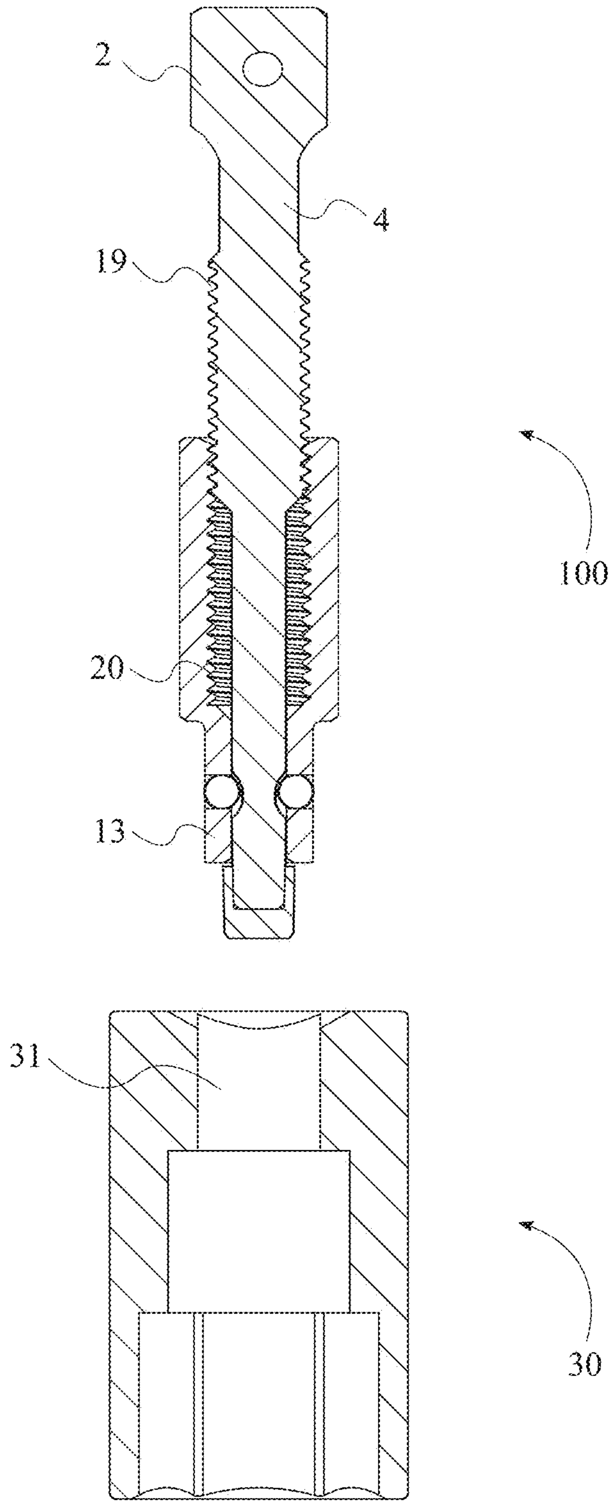
FIG. 18 is a front cutaway view of the present invention, showing the FORSA detached from the socket.

After removing the foreign object FO from the socket 30, the user can then perform the subsequent steps of detaching the FORSA 100 from the socket 30. As seen in FIG. 17, the user may first unlock the socket attachment body 13 from the socket 30 by applying appropriate clockwise or counter-clockwise torque to the drive head 2 in the loosening direction until the recessed section 6 of the pusher 1 is aligned with the cavity 24 of the retaining assembly 23. Resultantly, the recessed section 6 is configured to relieve pressure from at least one retaining assembly 23 of the present invention so that the socket 30 is unlocked and disengaged with the socket attachment body 13. Once unlocked, the user can slidably detach the socket attachment body 13 from the drive end 31 of the socket 30 as seen in FIG. 18, thereby removing the FORSA 100 from the socket 30.

Although the invention has been explained in relation to its preferred embodiment, it is to be understood that many other possible modifications and variations can be made without departing from the spirit and scope of the invention as hereinafter claimed.

What is claimed is:

1. A method for removing a foreign object from a socket, the method comprising the following steps:

providing a socket, the socket having a drive end and a socket opening;

providing a foreign object removal system adaptor, the foreign object removal system adaptor having a pusher, an adaptor, and at least one retaining assembly;

the pusher comprising a drive head and a main shaft, the main shaft having an external thread;

the adaptor comprising a socket attachment body and a main channel, the main channel having an internal thread;

the retaining assembly being operably connected to the pusher, the retaining assembly configured to secure the socket attachment body to the socket;

engaging the socket attachment body with the drive end of the socket;

threadedly engaging the main shaft of the pusher with the main channel of the adaptor;

engaging the retaining assembly by applying rotational torque to the drive head of the pusher in the tightening direction; and continue applying rotational torque to the drive head of the pusher to remove a foreign object from the socket opening.

2. The method for removing a foreign object from a socket as claimed in claim 1, further comprising:

disengaging the retaining assembly by applying rotational torque to the drive head of the pusher in the loosening direction, and detaching the socket attachment body from the drive end of the socket.

3. The method for removing a foreign object from a socket as claimed in claim 1, further comprising:

the main shaft having a recessed section;

the retaining assembly comprising a cavity and a retaining body, the cavity laterally traversing into the main channel through the socket attachment body, and the retaining body being engaged with the cavity;

the step of engaging the retaining assembly being accomplished by applying rotational torque to the drive head of the pusher until the recessed section is misaligned with the cavity.

4. The method for removing a foreign object from a socket as claimed in claim 3, further comprising:

disengaging the retaining assembly by applying rotational torque to the drive head of the pusher until the recessed section is aligned with the cavity, and detaching the socket attachment body from the drive end of the socket.

5. The method for removing a foreign object from a socket as claimed in claim 1, further comprising:

providing a shaft;

the pusher further comprising a torque-applying opening;

the torque-applying opening laterally traversing through the drive head;

engaging the shaft with the torque-applying opening; and the step of applying rotational torque to the drive head of the pusher being accomplished by applying lateral force to the shaft.

6. The method for removing a foreign object from a socket as claimed in claim 5, further comprising:

providing a second external torque tool;

the adaptor further comprising a tool body;

engaging the second external torque tool with the tool body; and the step of applying rotational torque to the drive head of the pusher being accomplished by applying opposite lateral forces to the shaft and the second external torque tool.

7. The method for removing a foreign object from a socket as claimed in claim 1, further comprising:
providing a first external torque tool;
engaging the first external torque tool with the drive head of the pusher; and
the step of applying rotational torque to the drive head of the pusher being accomplished by applying lateral force to the first external torque tool.

8. The method for removing a foreign object from a socket as claimed in claim 7, further comprising:
providing a second external torque tool;
the adaptor further comprising a tool body;
engaging the second external torque tool with the tool body; and
the step of applying rotational torque to the drive head of the pusher being accomplished by applying opposite lateral forces to the first external torque tool and the second external torque tool.

9. The method for removing a foreign object from a socket as claimed in claim 1, further comprising:
determining the geometric shape of the drive end of the socket; and
selecting the socket attachment body corresponding with the geometric shape of the drive end of the socket.

10. The method for removing a foreign object from a socket as claimed in claim 1, wherein the foreign object is removed from the socket opening in an axial motion.

11. The method for removing a foreign object from a socket as claimed in claim 3, wherein a diameter of the portion of an elongated section of the main shaft between the recessed section and the external thread is less than or equal to a diameter of the external thread.

12. A method for removing a foreign object from a socket, the method comprising the following steps:
providing a socket, the socket having a drive end and a socket opening;
providing a foreign object removal system adaptor, the foreign object removal system adaptor having a pusher, an adaptor, and at least one retaining assembly;
the pusher comprising a drive head and a main shaft, the main shaft having an external thread;
the adaptor comprising a socket attachment body and a main channel, the main channel having an internal thread;
the retaining assembly being operably connected to the pusher, the retaining assembly configured to secure the socket attachment body to the socket;
determining the geometric shape of the drive end of the socket;
selecting the socket attachment body corresponding with the geometric shape of the drive end of the socket;
engaging the socket attachment body with the drive end of the socket;
threadedly engaging the main shaft of the pusher with the main channel of the adaptor;
engaging the retaining assembly by applying rotational torque to the drive head of the pusher in the tightening direction; and
continue applying rotational torque to the drive head of the pusher to remove a foreign object from the socket opening.

13. The method for removing a foreign object from a socket as claimed in claim 12, further comprising:
disengaging the retaining assembly by applying rotational torque to the drive head of the pusher in the loosening direction, and
detaching the socket attachment body from the drive end of the socket.

14. The method for removing a foreign object from a socket as claimed in claim 12, further comprising:
the main shaft having a recessed section;
the retaining assembly comprising a cavity and a retaining body, the cavity laterally traversing into the main channel through the socket attachment body, and the retaining body being engaged with the cavity;
the step of engaging the retaining assembly being accomplished by applying rotational torque to the drive head of the pusher until the recessed section is misaligned with the cavity.

15. The method for removing a foreign object from a socket as claimed in claim 14, further comprising:
disengaging the retaining assembly by applying rotational torque to the drive head of the pusher until the recessed section is aligned with the cavity, and
detaching the socket attachment body from the drive end of the socket.

16. The method for removing a foreign object from a socket as claimed in claim 12, further comprising:
providing a shaft;
the pusher further comprising a torque-applying opening;
the torque-applying opening laterally traversing through the drive head; and
the step of applying rotational torque to the drive head of the pusher being accomplished by applying lateral force to the shaft.

17. The method for removing a foreign object from a socket as claimed in claim 16, further comprising:
providing a second external torque tool;
the adaptor further comprising a tool body;
engaging the second external torque tool with the tool body; and
the step of applying rotational torque to the drive head of the pusher being accomplished by applying opposite lateral forces to the shaft and the second external torque tool.

18. The method for removing a foreign object from a socket as claimed in claim 12, further comprising:
providing a first external torque tool;
engaging the first external torque tool with the drive head of the pusher; and
the step of applying rotational torque to the drive head of the pusher being accomplished by applying lateral force to the first external torque tool.

19. The method for removing a foreign object from a socket as claimed in claim 18, further comprising:
providing a second external torque tool;
the adaptor further comprising a tool body;
engaging the second external torque tool with the tool body; and
the step of applying rotational torque to the drive head of the pusher being accomplished by applying opposite lateral forces to the first external torque tool and the second external torque tool.

20. The method for removing a foreign object from a socket as claimed in claim 12, wherein the foreign object is removed from the socket opening in an axial motion.

21. The method for removing a foreign object from a socket as claimed in claim 14, wherein a diameter of the portion of an elongated section of the main shaft between the recessed section and the external thread is less than or equal to a diameter of the external thread.

* * * * *